(12) United States Patent
Mueller et al.

(10) Patent No.: US 10,455,437 B2
(45) Date of Patent: Oct. 22, 2019

(54) MOBILE MONITORING DEVICE AND METHOD OF COLLECTING SENSOR MEASURED DATA

(71) Applicant: Airbus Operations GmbH, Hamburg (DE)

(72) Inventors: Jan Mueller, Hamburg (DE); Tim Fuss, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 15/190,842

(22) Filed: Jun. 23, 2016

(65) Prior Publication Data

US 2016/0381586 A1 Dec. 29, 2016

(30) Foreign Application Priority Data

Jun. 26, 2015 (EP) .................................... 15174183

(51) Int. Cl.
*H04W 24/08* (2009.01)
*G01D 21/02* (2006.01)
(Continued)

(52) U.S. Cl.
CPC ............ *H04W 24/08* (2013.01); *G01D 21/02* (2013.01); *H04B 5/0012* (2013.01);
(Continued)

(58) Field of Classification Search
CPC combination set(s) only.
See application file for complete search history.

(56) References Cited

U.S. PATENT DOCUMENTS 9,766,064 B2 * 9/2017 Cheatham, III ....... G01B 11/00
2003/0218516 A1 * 11/2003 Gilbert .................... H01P 5/185
333/112

(Continued)

FOREIGN PATENT DOCUMENTS

EP 0660089 6/1995
WO WO 99/32856 A1 7/1999

OTHER PUBLICATIONS

Extended European Search Report for Application No. 15174183 dated Dec. 21, 2015.

*Primary Examiner* — Junpeng Chen
(74) *Attorney, Agent, or Firm* — Jenkins, Wilson, Taylor & Hunt, P.A.

(57) ABSTRACT

A mobile monitoring device including a data signal interface for coupling to a data line arranged in an aircraft and carrying one or more sensor signals, such that, in operation, the data signal interface branches off and receives as input signal part of the energy of the sensor signals carried on the data line such that the input signal is characteristic of the one or more sensor signals, and provide an output signal characteristic of the input signal. The mobile monitoring device further includes a wireless communication interface connected to the data signal interface for receiving the output signal and adapted to wirelessly transmit the output signal to a remote location. The present disclosure further relates to a system including an aircraft and the mobile monitoring device, and to a method of collecting sensor measurement data from a plurality of sensors of an aircraft using the mobile monitoring device.

14 Claims, 1 Drawing Sheet

(51) Int. Cl.
    *H04Q 9/00*     (2006.01)
    *H04B 5/00*     (2006.01)
    *H04L 12/26*     (2006.01)
    *H04W 4/04*     (2009.01)

(52) U.S. Cl.
    CPC ......... *H04B 5/0075* (2013.01); *H04L 43/028* (2013.01); *H04Q 9/00* (2013.01); *H04W 4/046* (2013.01); *H04Q 2209/30* (2013.01); *H04Q 2209/40* (2013.01); *H04Q 2209/43* (2013.01); *H04Q 2209/823* (2013.01); *H04Q 2209/88* (2013.01)

(56) References Cited

U.S. PATENT DOCUMENTS

| | | | |
|---|---|---|---|
| 2005/0232257 A1 | 10/2005 | Daley et al. | |
| 2007/0114422 A1* | 5/2007 | Berkcan | B64D 43/00 250/358.1 |
| 2008/0033607 A1* | 2/2008 | Zeliff | B64D 45/0005 701/31.4 |
| 2013/0307703 A1* | 11/2013 | Foucher | G01M 5/00 340/870.3 |
| 2014/0277838 A1 | 9/2014 | Flick | |
| 2017/0106997 A1* | 4/2017 | Bekanich | B64D 45/00 |

\* cited by examiner

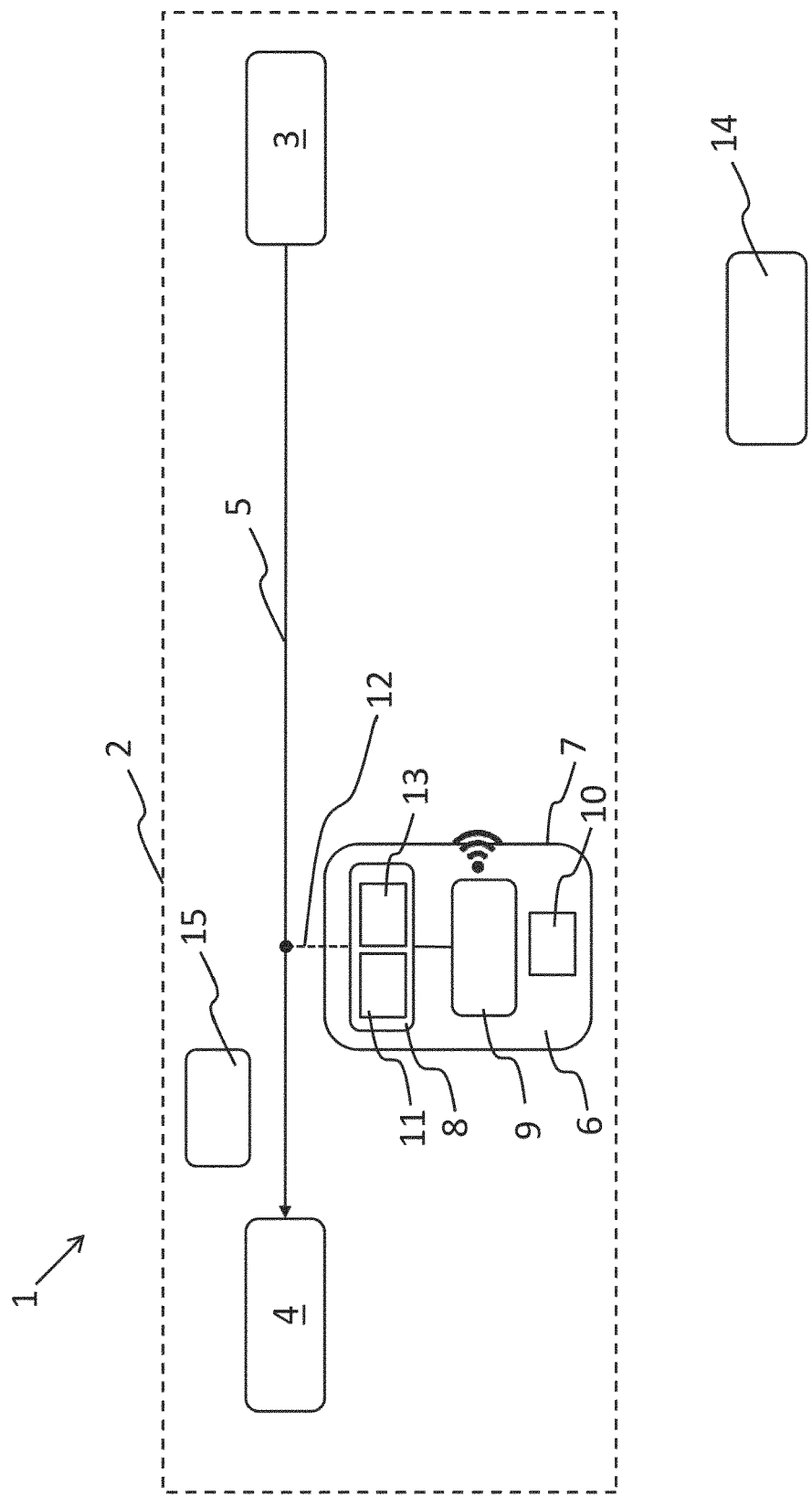

MOBILE MONITORING DEVICE AND METHOD OF COLLECTING SENSOR MEASURED DATA

CROSS-REFERENCE TO RELATED APPLICATION

This application claims priority to European Patent Application No. 15174183.2 filed Jun. 26, 2015, the entire disclosure of which is incorporated by reference herein.

TECHNICAL FIELD

The present application relates to a monitoring device for and aircraft and to a system and a method using such a monitoring device.

BACKGROUND

Aircraft comprise a plurality of sensors which are used for measuring various physical characteristics related to the aircraft and its operation. The sensors are typically distributed throughout the aircraft and are coupled to data lines in order to provide the sensor signals of the sensors, which sensor signals are characteristic of the various physical characteristics or measurement values, to one or more remote data collection or data processor. Each data line may be a bus line, which carries the sensor signals of more than one of the sensors, or a data line which is only associated with and coupled to one of the sensors. The data lines may carry the sensor signals in analog or digital form.

For many purposes it would be desirable to have free access to multiple ones of the measurement values and to link them together. However, the sensors typically provide their measurement values and corresponding sensor signals to a plurality of different data collection or data processing devices, and the data, although in principle available on-board the aircraft are not accessible outside the respective data collection or data processing device. Thus, for many types of aircraft all or most of the measurement values and sensor signals are not available for remote monitoring during operation or maintenance without costly and complex system redesign and upgrade.

SUMMARY

It is an object of the present disclosure to provide a simply and cost-efficient possibility to remotely monitor sensor signals and corresponding measurement values provided by multiple sensors distributed throughout an aircraft and connected to data lines carrying the sensor signals.

This object is achieved by a mobile monitoring device, system and method as disclosed herein. Preferred embodiments are the subject-matter of the respective dependent claims.

According to the disclosure herein, a mobile monitoring device is provided which comprises a data signal interface and a wireless communication interface connected to the data signal interface.

The data signal interface is adapted to be coupled to a data line of and arranged in an aircraft and carrying one or more sensor signals. Thus, such a data line is connected to one or more sensors, which transmit their sensor signals via the data line. The data line may be a bus line, which carries the sensor signals of more than one of sensor, or a data line which is only associated with and coupled to a single sensor. The data line may carry the sensor signal or signals in analog or digital form. It is to be noted that the data signal interface is adapted to be coupled to the data line, and not to a sensor or to another device connected to the data line, i.e. in operation it is preferably coupled to the data line remote from any sensor connected to the data line. In other words, the data signal interface is not adapted to interface with a sensor or at least must not be adapted to interface with a sensor.

Once coupled to a data line, the data signal interface is operable to branch off and receive as input signal part of the energy of the one or more sensor signals carried on the data line such that the input signal is characteristic of the one or more sensor signals, and to provide an output signal characteristic of the input signal. Thus, the coupling is such that it enables the data signal interface to receive energy from the sensor signals carried on the data line. As will be explained below, the coupling may be wireless or wired. Thus, the data signal interface is operable for non-intrusive wire-tapping or data sniffing with respect to sensor signals carried on a data line. The data signal interface is preferably constructed such that providing the output signal, i.e. generating the output signal from the input signal, comprises an analog-digital-conversion, either of the input signal or of an intermediate signal generated from the input signal by signal processing. Alternatively, in case the output signal is provided in analog form to the wireless communication interface, it is also possible that an analog-to-digital conversion of the output signal is carried out in the wireless communication interface prior to its transmission.

The wireless communication interface is adapted to receive the output signal of the data signal interface via the connection between the data signal interface and the wireless communication interface, and is further adapted to wirelessly transmit the output signal to a remote location. The wireless communication interface may be operating to one or more wireless communication protocol or standard, such as, e.g., Wi-Fi, Bluetooth or ZigBee.

The data signal interface and the wireless communication interface are preferably accommodated in a common housing.

The mobile monitoring device preferably comprises an independent energy source, such as, in particular, a rechargeable or non-rechargeable battery. The energy source may be provided as part of the data signal interface, as part of the wireless communication interface or separate from the two interfaces. Alternatively or additionally it may be preferable if the data signal interface or a separate power interface is adapted to receive energy for powering the mobile monitoring device from the data line. Such received energy may be used to power the device immediately upon receipt or may be stored in an energy storage device, such as a rechargeable battery or a capacitor. The energy for powering the mobile monitoring device may be received in the same manner as the input signal or as part of the input signal, i.e. may be part of the energy of the one or more sensor signals carried on the data line. However, this further decreases the energy of the sensor signals carried on the data line. Receiving energy for powering the mobile monitoring device may be particularly advantageously implemented in the case of a data line carrying analog sensor signals with a direct current offset. Then, a sufficient part of the energy of the direct current offset can be branched off for powering the device without decreasing the signal quality of the sensor signals in practice. For this purpose wired coupling of the data signal interface or of a separate power interface to the data signal interface via a branch line is effected.

The above mobile monitoring device provides the possibility of reading out available sensor data from data lines without complex and expensive modifications to the aircraft. The monitoring device is simple and inexpensive to produce and to handle. The load on the data line, such as a bus, is not increased allowing connection to data lines and busses with maximum fan-out limit. It is easily possible to retrofit an existing aircraft with a plurality of the monitoring devices in order to make sensor or measurement data, which were previously only available within separate aircraft devices, accessible to one or more external data collection and/or processing devices, which can receive the output signals wirelessly transmitted by the mobile monitoring devices. Consequently, it is possible to support remote and/or centralized data collection and analysis or big data with respect to an aircraft which previously did not provide this option.

Thus, by using the above mobile monitoring devices, it is possible to extend the available options for analysis of operational data in order to, e.g., determine predictions of lifetime and performance and generally support operation and maintenance.

For example, in operation the data collected from the mobile monitoring devices may enable smoother servicing and software retrofit of features that would normally need additional hardware or system modifications. One example is water pre-selection where the freshwater target level is set by the crew or airline operations and the servicing operator or vehicle receives the actual fill level of the water tank. Combining both values, which is not provided for by many existing aircraft, allows for on-target servicing and the aircraft can operate with lower water weight.

Moreover, deploying the mobile monitoring devices in various parts an aircraft system enables a detailed view of performance that the original aircraft was not capable of providing. External systems with access to the data may be able to influence configurations and neighboring systems that are impacted by the observed system to improve overall operation.

The data signal interface may be configured such that the output signal is identical or corresponds to the input signal or, in particular, to a digitized version of the input signal, so that the mobile monitoring device merely forwards the raw sensor signal or sensor data captured from the respective data line. It should be noted that it may also be possible in this regard to filter and/or amplify the input signal to produce the output signal without, however, interpreting or processing the actual sensor data. Such filtering and/or amplification may be carried out prior to or after an analog-digital-conversion as mentioned above. In these embodiments it is particularly preferred if the generation of the output signal from the input signal only includes the analog-digital-conversion or only the analog-digital-conversion together with filtering and/or amplification and/or signal shaping.

As an alternative or additionally, the data signal interface may advantageously comprise a processor which is arranged and adapted to receive the input signal and to process the input signal to generate the output signal. For this purpose, the processor implements a decoding module which is operable to calculate for one or more of the sensor signals, of which the input signal is characteristic, corresponding measurement values—or values of a physical characteristic related to the aircraft—and to generate the output signal such that it is characteristic of the one or more measurement values. Such a decoding module is operable to interpret the sensor signals and to calculate actual measurement values of physical quantities or characteristics measured by the respective sensors.

In this embodiment it is particularly preferred if the processor, and in particular, e.g., the decoding module, is adapted to generate the output signal such that it has a predefined format which is independent of the input signal and in which predefined portions indicate the measurement values. For example, the predefined portions may be predefined fields which indicate for each of one or more sensor signals the value of the corresponding measurement value as well as the unit of the corresponding measurement value and/or a designation of the measurement location, the measured quantity or the sensor. Such a configuration simplifies data collection, because the signals from a plurality of the mobile monitoring devices are simpler to collect and to analyze by remote devices.

Further, in each of the above embodiments in which the data signal interface comprises a processor the decoding module is preferably user-configurable such that it can be adapted by a user to different input signals. In particular, the user-configurable decoding module may comprise a configurable software decoder or a plurality of selectable software decoders. Due to the ability for a user to configure the decoding module, and in particular to configure or select a software decoder, a single mobile monitoring device may advantageously be used for different types of data lines and sensor signals while still providing the possibility of processing and interpreting the sensor signals. Software decoders provide a particularly simple and flexible possibility to read different kinds of communication standards without integration of specific communication modules.

In each of the above embodiments in which the data signal interface comprises a processor, the decoding module is preferably adapted to process the input signal in the form of analog data and/or the decoding module is preferably adapted to process the input signal in the form of digital data. In this regard, it is particularly advantageous if the decoding module is adapted to read and/or interpret bus messages transmitted via an analog or digital bus. Such bus messages may carry sensor data and then constitute the sensor signals, or may carry control data.

In a preferred embodiment the data signal interface is adapted to branch off signals only during predetermined or selectable time intervals, and/or the wireless communication interface is adapted to transmit the output signal only during predetermined or selectable time intervals. In this manner it is possible to reduce the power requirements of the mobile monitoring device. Additionally or alternatively, it is also advantageously possible to configure the mobile monitoring device such that the branching off of signals by the data signal interface and/or transmission of the output signal by the wireless communication interface depends on specific criteria, such as the availability of power to the mobile monitoring device or the information demand. For example, the above operations of the data signal interface and/or of the wireless communication interface may depend on the energy level of a battery powering the mobile monitoring device and/or on the operating state of the aircraft. Further additionally or alternatively, it is also advantageously possible to configure the mobile monitoring device such that the branching off of signals by the data signal interface and/or transmission of the output signal by the wireless communication interface depends on whether or not one or more defined limit values are exceeded by one or more parameters of the input or output signal or derived from or included in the input or output signal. For example, in the above-mentioned embodiments, in which the input signal is processed such that the output signal is characteristic of one or more measurement values, one or more limit values for the measurement values can be defined and the transmission of the output signal is only effected if one, more or all of the measurement values exceed corresponding ones of the limit values or do not exceed corresponding ones of the limit values. Moreover, in case of the data line being an analog or digital bus on which bus messages are transmitted, it is additionally or alternatively advantageously possible to configure the data signal interface such that the bus messages are filtered according to predefined or configurable filter criteria, so that only data corresponding to a subset of the bus messages are transmitted by the wireless communication interface. In this regard it is also possible for the data signal interface to adjust the bus message filter criteria based on a history of the bus messages and/or the power consumed and/or a target power consumption. All of the above measures enable a reduction of the power requirements of the mobile monitoring device.

As already noted above, the coupling of the data signal interface to a data line may be effected in different manners, and the data signal interface may be adapted for coupling according to one or more of these manners. Generally, it is possible that the coupling is effected in a wireless or contact-less manner, or that the coupling is effected in a wired manner. To provide wireless coupling the data signal interface may advantageously be adapted for capacitive or also for inductive coupling to a data line carrying electrical signals. The data signal interface then comprises a suitable capacitor arrangement or inductivity arrangement for receiving capacitive or inductive energy from a data line. Further, the mobile monitoring device and in particular a housing thereof may advantageously comprise a securing mechanism or means adapted for securing the mobile monitoring device to a data line in a position allowing the wireless receipt of energy from the sensor signals. To provide for wired coupling the data signal interface may advantageously be adapted to be coupled to a data line via a branch line. In this manner it would even be possible to use the mobile monitoring device with fiber optical data lines. For use with a branch line the data signal interface either includes such branch line to be connected to an existing data line or may include a terminal to which a separate branch line can be connected.

In a preferred embodiment the data signal interface is adapted to branch off less than 20%, preferably less than 15%, and more preferably less than 10% or, e.g., less than 5% of the energy carried on a data line to which the data signal interface is coupled. This ensures that the impact of the use of the mobile monitoring device on the signal quality of the data line is kept small. For example, for capacitive and inductive coupling this can be effected by suitably dimensioning one or more capacities in a capacitor arrangement and one or more inductances in an inductivity arrangement, respectively, in order to suitably select to strength of the capacitive or inductive coupling.

The above mobile monitoring devices may be advantageously used in a system comprising an aircraft, which in turn comprises at least one data line and at least one sensor, wherein each of the at least one sensor is coupled to one of the at least one data line, and wherein each of the at least one sensor is adapted to measure a respective physical characteristic related to the aircraft, generate a sensor signal representative of the physical characteristic and output the sensor signal to the data line to which it is coupled so that the data line carries the respective sensor signal. The system further comprises one or more of the mobile monitoring devices. Each such mobile monitoring device is coupled to one of the at least one data line in the above-described manner, i.e., such that, in operation, the data signal interface branches off and receives as input signal part of the energy of the one or more sensor signals carried on the respective data line. Finally the system comprises a sensor data collection device arranged separate from and external to the aircraft—such as, in particular, on the ground—or located within the aircraft and adapted to wirelessly receive the output signal of each mobile monitoring device.

In such a system the output signal of each of the one or more mobile monitoring devices may be received directly by the sensor data collection device. Alternatively or additionally the aircraft may comprise a relay device, which may be a fixed or portable device and is adapted to receive the output signal of at least one of the at least one mobile monitoring device and to forward the received output signals to the sensor data collection device.

In a preferred embodiment the sensor data collection device is further adapted to store and analyze the received output signals.

As can already be taken from the above detailed explanation of the use and application of the mobile monitoring devices, they may advantageously be used in a method of collecting sensor measurement data from a plurality of sensors of an aircraft. The aircraft comprises one or more data lines and one or more sensors, wherein each such sensor is coupled to one of the data lines. Further, each of the sensors is adapted to measure a respective physical characteristic related to the aircraft, generate a sensor signal representative of the physical characteristic and output the sensor signal to the data line to which it is coupled so that the data line carries the respective sensor signal. The method comprises coupling each of one or more of the above mobile monitoring devices to one of the data lines in the manner described in detail above, i.e. such that the data signal interface branches off and receives as input signal part of the energy of the one or more sensor signals carried on the respective data line. Further, the method comprises receiving the output signal of each of the monitoring devices at a sensor data collection device arranged separate from and external to the aircraft or arranged within the aircraft. Thus, the method may be utilized for retrofitting an existing aircraft in order to provide access to sensor data by the sensor data collection device.

In a preferred embodiment each of the one or more mobile monitoring devices is one of the above-described mobile monitoring devices comprising a user-configurable decoding module. The method then further comprises configuring for each of the mobile monitoring devices the decoding module to adapt it to the sensor signals carried on the respective data line.

BRIEF DESCRIPTION OF THE DRAWINGS

In the following a preferred embodiment of the disclosure herein will be described in detail with reference to the single FIGURE.

FIG. 1 shows a system comprising an aircraft and a mobile monitoring device according to the present disclosure.

DETAILED DESCRIPTION

The system 1 shown in FIG. 1 comprises an aircraft 2 in which a sensor 3 is arranged to measure a physical characteristic relating to the aircraft 2 or its operation. For example, the sensor 3 could be a temperature sensor. The sensor 3 is coupled to a remote device 4, such as an on-board computer, by a data line 5 carrying electrical sensor signals generated by the sensor 3.

The system 1 further comprises a mobile monitoring device 6, which comprises, in a housing 7, a data signal interface 8, a wireless communication interface 9 and a rechargeable battery 10 for powering the data signal interface 8 and the wireless communication interface 9. The data signal interface 8 comprises a capacitor arrangement 11 adapted to capacitively couple the data signal interface 8 to the data line 5 remote from both the sensor 3 and the computer 4. The capacitive coupling 12 is such that the data signal interface 8 and in particular the capacitor arrangement 11 receives as input signal part of the energy of the electrical sensor signal carried on the data line 5. The input signal is characteristic of the sensor signal provided by the sensor 3. For the purpose of coupling it may be necessary to slightly modify the data line at the location of coupling, e.g. by at least partially removing a shielding.

It is to be noted that, as noted above, a part of the energy of the input signal could also be used to recharge the battery 10. Alternatively, in particular if the capacitive coupling 12 would be replaced with a wired coupling another part of energy present or carried on the data line 5 could be branched off by the data signal interface 8 or by a separate power interface.

The data signal interface 8 also comprises a processor 13 connected to the capacitor arrangement 11 and operable to receive the input signal from the capacitor arrangement 11 and process the input signal to generate an output signal. The processing, which involves analog-to-digital conversion of the input signal, possibly subsequent to filtering and/or amplification of the input signal, is carried out such that the input signal and the sensor signal embodied therein are interpreted and a measurement value corresponding to the sensor signal is calculated. The output signal, while still characteristic of the sensor signal, then includes a representation of the calculated measurement value. The digital output signal is received by the wireless communication interface 9 and transmitted wirelessly to remote devices.

For example, the output signal may be received at one or more data collection and analysis devices 14, which are provided as part of the system 1 external to the aircraft 2 and, preferably, on the ground. The output signal may be received directly by the devices 14 or via one or more relay devices 15 arranged inside the aircraft 2. It is to be noted that the device 15 may also be a local data collection and analysis device instead of a relay device.

Due to the mobile monitoring device 7 it is advantageously possible to access the sensor signal for remote or external collection and analysis with only minimum modification of the aircraft 2.

Although only one sensor, only one data line and only one mobile monitoring device is shown, the system 1 preferably comprises a plurality of sensors and mobile monitoring devices and preferably also a plurality of data lines.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A mobile monitoring device comprising:
   a data signal interface configured to:
      be coupled to a data line arranged in an aircraft and carrying one or more sensor signals, such that, in operation, the data signal interface branches off and receives as input signal part of the energy of the one or more sensor signals carried on the data line such that the input signal is characteristic of the one or more sensor signals; and
      provide an output signal characteristic of the input signal; and
   a wireless communication interface connected to the data signal interface and configured for receiving the output signal and configured to wirelessly transmit the output signal to a remote location, wherein the mobile monitoring device is configured to wirelessly transmit the output signal to the remote location only if one or more parameters of the input signal or the output signal or derived from or included in the input signal or the output signal exceed one or more predefined limit values, and
   wherein the data signal interface is further configured to be capacitively or inductively coupled to a data line, and
   wherein the data signal interface is configured to filter bus messages transmitted on the data line in accordance with defined filter criteria and generate the output signal such that it is only characteristic of bus messages passing the filtering, and
   wherein the data signal interface is configured to adjust the bus message filter criteria based on one or more of: a history of the bus messages, the power consumed, and a target power consumption.

2. The mobile monitoring device according to claim 1, wherein the output signal is a digitized version of the input signal.

3. The mobile monitoring device according to claim 1, wherein the data signal interface comprises a processor which is arranged and configured to receive the input signal and to process the input signal to generate the output signal, wherein the processor implements a decoding module which is operable to calculate for one or more of the sensor signals, of which the input signal is characteristic, corresponding measurement values and to generate the output signal such that it is characteristic of the one or more measurement values.

4. The mobile monitoring device according to claim 3, wherein the processor is configured to generate the output signal such that it has a predefined format which is independent of the input signal and in which predefined portions indicate the measurement values.

5. The mobile monitoring device according to claim 3, wherein the decoding module is user-configurable such that it can be configured by a user to different input signals.

6. The mobile monitoring device according to claim 5, wherein the user-configurable decoding module comprises a configurable software decoder or a plurality of selectable software decoders.

7. The mobile monitoring device according to claim 3, wherein the decoding module is configured to process the input signal in the form of analog data and/or wherein the decoding module is configured to process the input signal in the form of digital data.

8. The mobile monitoring device according to claim 1, wherein the data signal interface is configured to be coupled to a data line via a branch line.

9. The mobile monitoring device according to claim 1, wherein the data signal interface is configured to branch off less than 10% of the energy carried on a data line to which the data signal interface is coupled.

10. The mobile monitoring device according to claim 1, wherein the mobile monitoring device comprises an energy source in the form of a rechargeable or non-rechargeable battery, or wherein the mobile monitoring device is configured to receive energy for powering the mobile monitoring device from the data line.

11. A system comprising:
an aircraft comprising:
at least one data line; and
at least one sensor;
wherein each of the at least one sensor is coupled to one of the at least one data line, and
wherein each of the at least one sensor is configured to measure a respective physical characteristic related to the aircraft, generate a sensor signal representative of the physical characteristic and output the sensor signal to the data line to which it is coupled so that the data line carries the respective sensor signal;
at least one mobile monitoring device comprising:
a data signal interface configured to:
be coupled to a data line arranged in an aircraft and carrying one or more sensor signals, such that, in operation, the data signal interface branches off and receives as input signal part of the energy of the one or more sensor signals carried on the data line such that the input signal is characteristic of the one or more sensor signals; and
provide an output signal characteristic of the input signal; and
a wireless communication interface connected to the data signal interface for receiving the output signal and configured to wirelessly transmit the output signal to a remote location, wherein the at least one mobile monitoring device is configured to wirelessly transmit the output signal to the remote location only if one or more parameters of the input signal or the output signal or derived from or included in the input signal or the output signal exceed one or more predefined limit values, and wherein the data signal interface is further configured to be capacitively or inductively coupled to a data line, and
wherein the data signal interface is configured to filter bus messages transmitted on the data line in accordance with defined filter criteria and generate the output signal such that it is only characteristic of bus messages passing the filtering, and
wherein the data signal interface is configured to adjust the bus message filter criteria based on one or more of: a history of the bus messages, the power consumed, and a target power consumption; and
a sensor data collection device located separate from and external to the aircraft or located within the aircraft and configured to wirelessly receive the output signal of each of the at least one mobile monitoring device,
wherein each of the at least one mobile monitoring device is coupled to one of the at least one data line such that the data signal interface branches off and receives as input signal part of the energy of the one or more sensor signals carried on the respective data line.

12. The system according to claim 11, wherein the output signal of each of the at least one mobile monitoring device is received directly by the sensor data collection device, or wherein the aircraft comprises a relay device configured to receive the output signal of at least one of the at least one mobile monitoring device and to forward the received output signals to the sensor data collection device.

13. A method of collecting sensor measurement data from a plurality of sensors of an aircraft, comprising at least one data line and at least one sensor, wherein each of the at least one sensor is coupled to one of the at least one data line, and wherein each of the at least one sensor is configured to measure a respective physical characteristic related to the aircraft, generate a sensor signal representative of the physical characteristic and output the sensor signal to the data line to which it is coupled so that the data line carries the respective sensor signal, the method comprising:
coupling each of at least one mobile monitoring device to one of the data lines such that the data signal interface branches off and receives as input signal part of the energy of the one or more sensor signals carried on the respective data line, the at least one mobile monitoring device comprising:
a data signal interface configured to:
be coupled to a data line arranged in an aircraft and carrying one or more sensor signals, such that, in operation, the data signal interface branches off and receives as input signal part of the energy of the one or more sensor signals carried on the data line such that the input signal is characteristic of the one or more sensor signals; and
provide an output signal characteristic of the input signal; and
a wireless communication interface connected to the data signal interface for receiving the output signal and configured to wirelessly transmit the output signal to a remote location, wherein at least one mobile monitoring device is configured to wirelessly transmit the output signal to the remote location only if one or more parameters of the input signal or the output signal or derived from or included in the input signal or the output signal exceed one or more predefined limit values, and
wherein the data signal interface is further configured to be capacitively or inductively coupled to a data line, and wherein the data signal interface is configured to filter bus messages transmitted on the data line in accordance with defined filter criteria and generate the output signal such that it is only characteristic of bus messages passing the filtering, and wherein the data signal interface is configured to adjust the bus message filter criteria based on one or more of: a history of the bus messages, the power consumed, and a target power consumption; and receiving the output signal of each of the at least one mobile monitoring device at a sensor data collection device arranged separate from and external to the aircraft or arranged within the aircraft.

14. The method according to claim 13, wherein the data signal interface comprises a processor which is arranged and configured to receive the input signal and to process the input signal to generate the output signal, wherein the processor implements a decoding module which is operable to calculate for one or more of the sensor signals, of which the input signal is characteristic, corresponding measurement values and to generate the output signal such that it is characteristic of the one or more measurement values;

wherein the decoding module is user-configurable such that it can be configured by a user to different input signals; and the method further comprising configuring for each of the at least one mobile monitoring device the decoding module to adapt it to the sensor signals carried on the respective data line.

* * * * *